Patented Apr. 18, 1933

1,904,821

UNITED STATES PATENT OFFICE

RAINALD BRIGHTMAN, OF MANCHESTER, ENGLAND, ASSIGNOR TO IMPERIAL CHEMICAL INDUSTRIES LIMITED, OF WESTMINSTER, ENGLAND

DISAZO DYESTUFFS AND METHOD OF PREPARING SAME

No Drawing. Application filed August 6, 1930, Serial No. 473,512, and in Great Britain August 15, 1929.

This invention relates to the orange disazo dyestuffs and the method of preparation of the same. More particularly it relates to dyes made by coupling tetrazotized m:m'-tolidine with one molecular proportion of salicylic acid and with one molecular proportion of a compound of the naphthalene series capable of coupling with diazo compounds.

It is known that the disazo derivatives of m:m'-tolidine (2:2'-dimethyl-4:4'-diaminodiphenyl) have much less affinity for cotton than those derived from benzidine and its 3:3'-substituted derivatives (dianisidine, tolidine, etc.). See Fierz-David- "Kunstliche organische Fabstoffe" Berlin 1926 p. 180 line 5 ff. and such dyestuffs accordingly have received little attention and have been of little practical importance. In British patent specifications Nos. 10331 and 28678 of 1910 certain of such dyestuffs have however been described.

It is the object of the present invention to prepare from m:m'-tolidine dyestuffs yielding yellowish to reddish orange dyeings characterized by excellent fastness to washing, alkaline milling, and stoving, and characterized further by good levelling properties.

These objects are accomplished by coupling tetrazotized m:m'-tolidine (2:2'-dimethyl-4:4'-diaminodiphenyl) with one molecular proportion of salicylic acid and with one molecular proportion of either 2-naphthol, 2-naphthol-monosulphonic acid, 2-naphthylamine-6-sulphonic acid, or 2-methyl-aminonaphthalene-7-sulphonic acid.

The general formula covering broadly these dyes may be represented as follows:

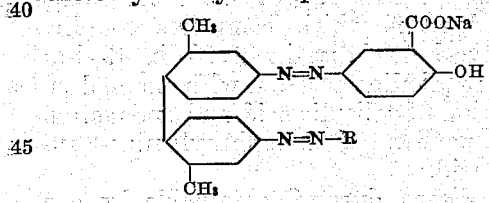

in which R represents an aromatic radical of the naphthalene series capable of coupling with diazo compounds as represented by such compounds as 2-naphthol and its monosulphonic acids, 2-naphthylamine-6-sulphonic acid, and 2-methyl-amino-naphthalene-7-sulphonic acid.

My invention is illustrated by the following examples, in which the parts are by weight.

*Example 1.*—212 parts of 4:4'-diamino-2:2'-dimethyldiphenyl are tetrazotized in the known manner with 138 parts of sodium nitrite and 500 parts of 36% hydrochloric acid. The tetrazo solution is stirred into a well cooled solution containing 138 parts of salicylic acid and 500 parts of sodium carbonate. Stirring is continued and when combination is complete a solution of 224 parts of 2-naphthol-6-sulphonic acid is added. The mixture is stirred and maintained cold and alkaline until combination is complete when the coupling is heated up and the dyestuff precipitated by the addition of common salt. It forms a yellowish red powder which dyes wool in orange shades which level well and are very fast to alkaline milling, to stoving and to light.

The formula for the dye obtained by Example #1 is probably

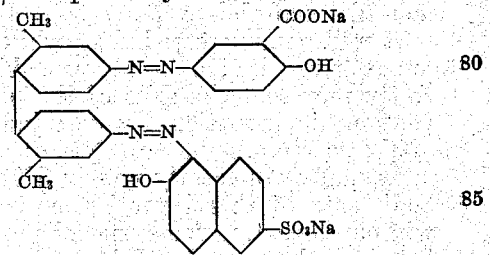

*Example 2.*—To the solution of tetrazo compound prepared from 212 parts of m:m'-tolidine with 138 parts of sodium nitrite and 500 parts of 36% hydrochloric acid there is added a solution containing 223 parts of 2-naphthylamine-6-sulphonic acid. After stirring for some time the mixture, which is maintained cold, is made alkaline by the addition of about 500 parts of sodium carbonate and a solution of 160 parts of sodium salicylate is then added. The mixture is stirred until coupling is complete when it is heated up and the dyestuff isolated by the addition of common salt. It dyes wool and orange yellow shade very fast to alkaline milling.

The formula for the dye obtained by Example #2 is probably

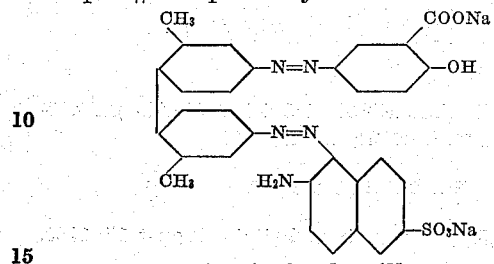

The invention is further illustrated by the examples in the following table:—

| m:m'-tolidine tetrazotized and coupled with | | Shade on wool |
|---|---|---|
| (1) 1 molecule of | (2) 1 molecule of | |
| Salicylic acid | methyl - 2 - naphthylamino - 7 - sulphonic acid | Brownish-orange |
| Salicylic acid | β-naphthol- | Orange |
| Salicylic acid | F acid | Reddish-orange |
| Methyl - 2 - naphthylamine - 7 - sulphonic acid | 2 - naphthol - 6 - sulphonic acid | Scarlet |

It will be noted from Examples 1 and 2 that in each instance the couplings with salicylic acid are carried out in alkaline reactions. Obviously, however, the examples are furnished by way of illustration merely and it is not applicant's intention to be limited to the exact reagents and proportions therein disclosed.

Dyeings on wool when made with the dyes of the present invention are characterized by excellent fastness to washing, alkaline milling, and stoving. They are further characterized by excellent levelling properties. They may, moreover, be used for silk, felt and like materials.

It will be understood that, while the formulas given herein in all probability correctly represent the dyes of the present invention, the invention is wholly independent of the correctness of such formulas.

As many apparently widely different embodiments of this invention may be made without departing from the spirit thereof, it is to be understood that I do not limit myself to the foregoing examples or descriptions except as indicated in the following patent claims.

I claim:

1. An orange disazo dyestuff represented by the following general formula

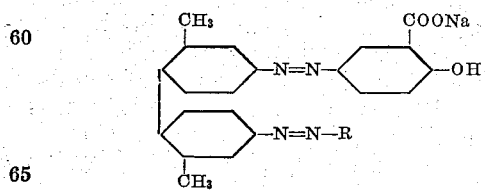

in which R represents a radical of the naphthalene series capable of coupling with diazo compounds, comprising a residue of a group consisting of a naphthol, a naphthylamine, a naphthol-sulphonic acid and a naphthylamine-sulphonic acid.

2. An orange disazo dyestuff obtainable by coupling tetrazotized m:m'-tolidine with one molecular proportion of 2-methyl-aminonaphthalene-7-sulphonic acid and with one molecular proportion of a naphthalene compound of the group consisting of 2-naphthol, 2-naphthol-sulphonic acids, and 2-naphthylamine-6-sulphonic acid.

3. An orange disazo dyestuff represented by the following general formula

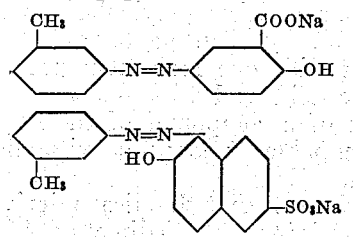

4. An orange disazo dyestuff represented by the following general formula

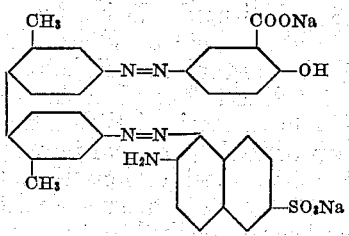

5. The process of preparing an orange disazo dyestuff which comprises coupling tetrazotized m:m'-tolidine with one molecular proportion of 2 - methyl - amino - naphthalene-7-sulphonic acid and with one molecular proportion of a naphthalene compound of the group consisting of 2-naphthol, 2-naphthol-sulphonic acids, and 2-naphthylamine-6-sulphonic acid.

6. The process of preparing an orange disazo dyestuff which comprises coupling tetrazotized 4:4' - diamino - 2:2' - dimethyl - diphenyl in alkaline solution with one molecular proportion of salicylic acid and one molecular proportion of 2-naphthol-6-sulphonic acid.

7. The process of preparing an orange disazo dyestuff which comprises coupling tetrazotized 4:4'-diamino-2:2'-dimethyl-diphenyl in alkaline solution with one molecular portion of salicylic acid and one molecular proportion of 2-naphthylamine-6-sulphonic acid.

8. A disazo dyestuff obtainable by coupling tetrazotized m:m' tolidine with one molecular proportion of a compound of the group consisting of salicylic acid and a methyl-2-naphthyl-amine-7-sulphonic acid and with one molecular proportion of a naphthalene compound of the group consisting of 2-naphthol, 2-naphthol-sulphonic acids, and 2-naphthyl amine-6-sulphonic acids.

In testimony whereof, I affix my signature.

RAINALD BRIGHTMAN.